(12) United States Patent
Wang et al.

(10) Patent No.: US 12,133,200 B2
(45) Date of Patent: *Oct. 29, 2024

(54) USER EQUIPMENT, BASE STATION AND WIRELESS COMMUNICATION METHOD

(71) Applicant: Panasonic Intellectual Property Corporation of America, Torrance, CA (US)

(72) Inventors: Lilei Wang, Beijing (CN); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,910

(22) Filed: Dec. 11, 2023

(65) Prior Publication Data

US 2024/0129899 A1    Apr. 18, 2024

Related U.S. Application Data

(63) Continuation of application No. 17/056,641, filed as application No. PCT/CN2018/090737 on Jun. 12, 2018, now Pat. No. 11,882,544.

(51) Int. Cl.
*H04W 72/02* (2009.01)
*H04W 72/0446* (2023.01)
(Continued)

(52) U.S. Cl.
CPC ....... *H04W 72/02* (2013.01); *H04W 72/0446* (2013.01); *H04W 72/0453* (2013.01); *H04W 72/56* (2023.01); *H04W 92/18* (2013.01)

(58) Field of Classification Search
CPC . H04W 72/02; H04W 72/56; H04W 72/0446; H04W 72/0453; H04W 92/18
See application file for complete search history.

(56) References Cited

U.S. PATENT DOCUMENTS

| 2013/0223356 A1 | 8/2013 | Khoshnevis et al. |
| 2017/0134146 A1 | 5/2017 | Chae et al. |

(Continued)

FOREIGN PATENT DOCUMENTS

| JP | 2015508943 A | 3/2015 |
| JP | 2017525222 A | 8/2017 |
| WO | WO 2018084571 A1 | 5/2018 |

OTHER PUBLICATIONS

Huawei, HiSilicon, "Summary of remaining issues on bandwidth par and wideband operation," R1-1801347, Agenda Item: 7.1.3.4.1, 3GPP TSG RAN WGI Meeting #92, Athens, Greece, Feb. 26-Mar. 2, 2018, 13 pages.

(Continued)

*Primary Examiner* — Michael Thier
*Assistant Examiner* — Nevena Zecevic Sandhu
(74) *Attorney, Agent, or Firm* — Seed IP Law Group LLP

(57) ABSTRACT

Provided are a user equipment, base station and wireless communication methods related to resource configuration for sidelink communication, sidelink discovery or any other sidelink operation in NR. A user equipment comprises: circuitry operative to determine a Bandwidth Part (BWP) assigned for sidelink transmission and reception in a carrier; and a transceiver operative to perform the sidelink transmission and reception on the determined BWP in the carrier, wherein dynamic BWP switching is not supported for the sidelink transmission and reception in the carrier.

12 Claims, 12 Drawing Sheets

(51) Int. Cl.
*H04W 72/0453* (2023.01)
*H04W 72/56* (2023.01)
*H04W 92/18* (2009.01)

(56) References Cited

U.S. PATENT DOCUMENTS

| | | |
|---|---|---|
| 2019/0053227 A1 | 2/2019 | Huang et al. |
| 2020/0154397 A1 | 5/2020 | Kim et al. |
| 2020/0266958 A1 | 8/2020 | Liu et al. |
| 2021/0176096 A1 | 6/2021 | Shimoda et al. |
| 2021/0176747 A1 | 6/2021 | Yang et al. |

OTHER PUBLICATIONS

Indian Examination Report dated Aug. 3, 2022 for the related Indian Patent Application No. 202047051227, 7 pages.
International Search Report of PCT application No. PCT/CN2018/090737 dated Feb. 27, 2019.
The Extended European Search Report dated May 21, 2021 for the related European Patent Application No. 18922789.5.

USER EQUIPMENT, BASE STATION AND WIRELESS COMMUNICATION METHOD

BACKGROUND

1. Technical Field

The present disclosure relates to the field of wireless communication, and in particular, to a user equipment (UE), a base station (gNB) and wireless communication methods related to resource configuration for sidelink communication, sidelink discovery or any other sidelink operation in NR (New Radio access technology).

2. Description of the Related Art

In Long Term Evolution (LTE) V2X (Vehicle to anything), the concept of resource pool is adopted to implement resource (pre)configuration for sidelink communication, that is, to indicate operated time/frequency location of sidelink transmission/reception. Resource pool configuration is semi-statically indicated by Radio Resource Control (RRC) signaling and includes both time and frequency information in a carrier. One resource pool is selected for transmission based on UE (vehicle)'s zone position (zone and resource pool relation is (pre)configured) in a carrier.

In NR, the concept of Bandwidth part (BWP) is adopted to implement resource configuration and mainly targeted for power saving. BWP is a new concept specified in NR and it consists of one or multiple continuous Physical Resource Blocks (PRBs) in frequency domain in a carrier. Thus, BWP may be considered as subdivision of a carrier. For example, a UE can be operated in a wide BWP in case that there is traffic and in a narrow BWP in case that there is no or less traffic. In NR, maximum 4 BWPs can be configured in a carrier and only one BWP is active at one direction (Downlink (DL) or Uplink (UL)) at one time. Dynamic BWP switching via Downlink Control Information (DCI) is also supported currently in NR.

So far, sidelink discussion in NR is still in a very initial phase and how to configure the resource for sidelink communication, sidelink discovery or any other sidelink operation in NR is unclear.

SUMMARY

One non-limiting and exemplary embodiment facilitates determining the resource for sidelink communication, sidelink discovery or any other sidelink operation in NR to reduce the complexity of the receiver design and to improve the system performance.

In a first general aspect of the present disclosure, there is provided a user equipment, comprising: circuitry operative to determine a Bandwidth Part (BWP) assigned for sidelink transmission and reception in a carrier; and a transceiver operative to perform the sidelink transmission and reception on the determined BWP in the carrier, wherein dynamic BWP switching is not supported for the sidelink transmission and reception in the carrier.

In a second general aspect of the present disclosure, there is provided a wireless communication method for a user equipment, comprising: determining a Bandwidth Part (BWP) assigned for sidelink transmission and reception in a carrier; and performing the sidelink transmission and reception on the determined BWP in the carrier, wherein dynamic BWP switching is not supported for the sidelink transmission and reception in the carrier.

In a third general aspect of the present disclosure, there is provided a base station, comprising: circuitry operative to generate a Bandwidth Part (BWP) configuration signaling in which a bitmap indicating a time domain resource for sidelink transmission and reception is included; a transmitter operative to transmit the BWP configuration signaling to a user equipment, wherein a BWP assigned for the sidelink transmission and reception in a carrier is determined by the user equipment based on the BWP configuration signaling, and wherein dynamic BWP switching is not supported for the sidelink transmission and reception in the carrier.

In a fourth general aspect of the present disclosure, there is provided a wireless communication method for a base station, comprising: generating a Bandwidth Part (BWP) configuration signaling in which a bitmap indicating a time domain resource for sidelink transmission and reception is included; transmitting the BWP configuration signaling to a user equipment, wherein a BWP assigned for the sidelink transmission and reception in a carrier is determined by the user equipment based on the BWP configuration signaling, and wherein dynamic BWP switching is not supported for the sidelink transmission and reception in the carrier.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
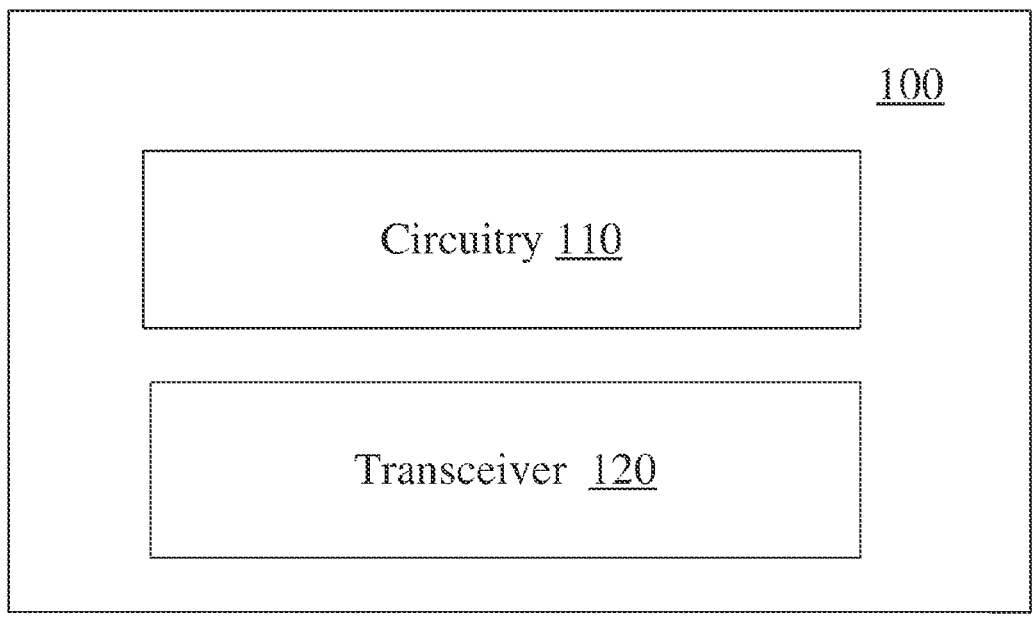
FIG. 1 illustrates a block diagram of a part of a user equipment according to an embodiment of the present disclosure.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

In an embodiment of the present disclosure, there is provided a user equipment as shown in FIG. 1. FIG. 1 illustrates a block diagram of a part of a user equipment 100 according to an embodiment of the present disclosure. As shown in FIG. 1, the UE 100 may include circuitry 110 and a transceiver 120. The circuitry 110 is operative to determine a Bandwidth Part (BWP) assigned for sidelink transmission and reception in a carrier. The transceiver 120 is operative to perform the sidelink transmission and reception on the determined BWP in the carrier. Dynamic BWP switching is not supported for the sidelink transmission and reception in the carrier.

As described above, the BWP concept is adopted in NR mainly for the purpose of power saving, and dynamic BWP switching is supported currently in NR. However, for sidelink operation, there is no motivation of dynamic BWP switching. For example, first, vehicle is not limited by battery power. Second, dynamic BWP switching makes receiver design complicated since the UE may need to simultaneously monitor multiple BWPs in a carrier, which is not aligned with the existing NR framework. Thus, in the present disclosure, dynamic BWP switching is not supported for the sidelink transmission and reception in the carrier.

Figure 2:
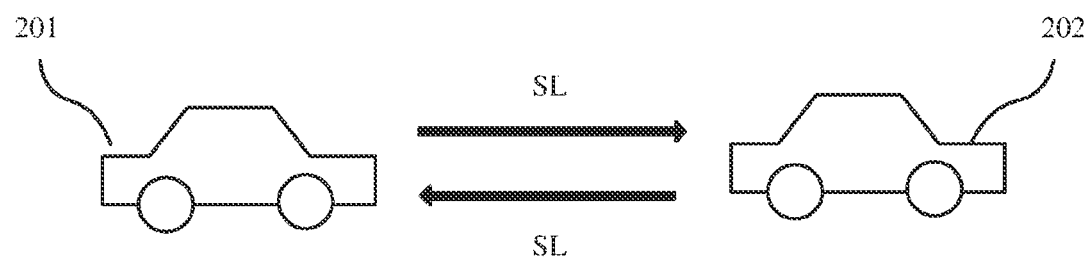
FIG. 2 schematically shows an exemplary scenario of sidelink transmission and reception in NR.

For example, in order to facilitate understanding, FIG. 2 schematically shows an exemplary scenario of sidelink transmission and reception in NR. As shown in FIG. 2, communication may be performed between two vehicles 201 and 202 via sidelinks as shown by two thick arrows noted as "SL". The UE 100 shown in FIG. 1 may be the vehicle 201 and another user equipment communicating with the UE 100 may be the vehicle 202, and vice versa.

For example, the vehicle 201 may determine a BWP assigned for sidelink transmission and reception in a carrier and then transmit a sidelink signal on the BWP in the carrier to the vehicle 202. Here, the sidelink signal transmitted from the UE 100 (e.g. the vehicle 201) to the another UE (e.g. the vehicle 202) could be a control channel like Physical Sidelink Control Channel (PSCCH), a data channel like Physical Sidelink Shared Channel (PSSCH) or a synchronization channel like Physical Sidelink Broadcast Channel (PSBCH)/Primary Sidelink Synchronisation Signal (PSSS), for example. Also, the vehicle 201 may receive a sidelink signal from the vehicle 202 on the BWP.

Different from the current specification in NR, in the present disclosure, dynamic BWP switching is not supported for the sidelink transmission and reception in the carrier. Since dynamic BWP switching is not supported for the sidelink transmission and reception, the receiver design needs not to be complicated.

In addition, the exemplary scenario explained with reference to FIGS. 1-2 may corresponding to an unlicensed carrier case in which there is no signaling between the user equipment and a base station in the carrier. For example, the carrier is an unlicensed carrier for ITS. In this case, one BWP may be equivalent to one carrier. More details of the unlicensed carrier case will be discussed later.

It can be specified in the standard that dynamic BWP switching is not supported for sidelink transmission and reception. However, the present disclosure is not limited thereto. It also can be configured or preconfigured through signaling that dynamic BWP switching is not supported for sidelink transmission and reception. For example, when the UE 100 is in coverage of a BS, the UE 100 may receive the signaling which configures that dynamic BWP switching is not supported for sidelink transmission and reception from the BS. In contrast, when the UE 100 is out of coverage of any BS, it is possible to preconfigure that dynamic BWP switching is not supported for sidelink transmission and reception for example via the signaling which is set and stored in advance in the UE 100 by the operator when designing the UE 100.

With the user equipment 100 as shown in FIG. 1, since dynamic BWP switching is not supported for sidelink transmission and reception, the complexity of the receiver design may be reduced and the system performance may be improved.

As described above, sidelink discussion in NR is still in a very initial phase and how to configure the resource for sidelink communication, sidelink discovery or any other sidelink operation in NR is unclear. For example, one of issues to be considered is how sidelink transmission and reception as well as signal interaction with a base station (Uu) can coexist in an uplink carrier in NR. For example, if sidelink transmission and reception coexist with Uu communication within the same BWP, it seems difficult to apply dynamic BWP switching for Uu. The reason is that dynamic BWP switching will complicate sidelink receiver which needs to monitor multiple BWPs to receive the sidelink messages in a carrier, and that dynamic BWP switching will impact sidelink sensing performance due to interference variation. This is also true for sidelink operation for ITS carrier. However, no dynamic BWP switching for Uu (e.g., for enhanced Mobile BroadBand (eMBB) or Ultra Reliable & Low Latency Communication (URLLC)) may impact Uu performance in terms of power saving, load balancing and so on.

It is noted that an ITS carrier is like 5.9 GHz spectrum regulated for intelligent transportation system while a Uu carrier is a licensed carrier operated in certain bands managed by the operator. Since the concepts of the ITS carrier and the Uu carrier are well known to those skilled in the art, they will not be explained in more details in order to avoid confusing the inventive point of the present disclosure.

In view of the above, according to an embodiment of the present disclosure, in the UE 100 as shown in FIG. 1, the BWP is used for the sidelink transmission and reception only, and wherein another BWP is assigned for transmission between the user equipment and a base station in the carrier.

Figure 3:
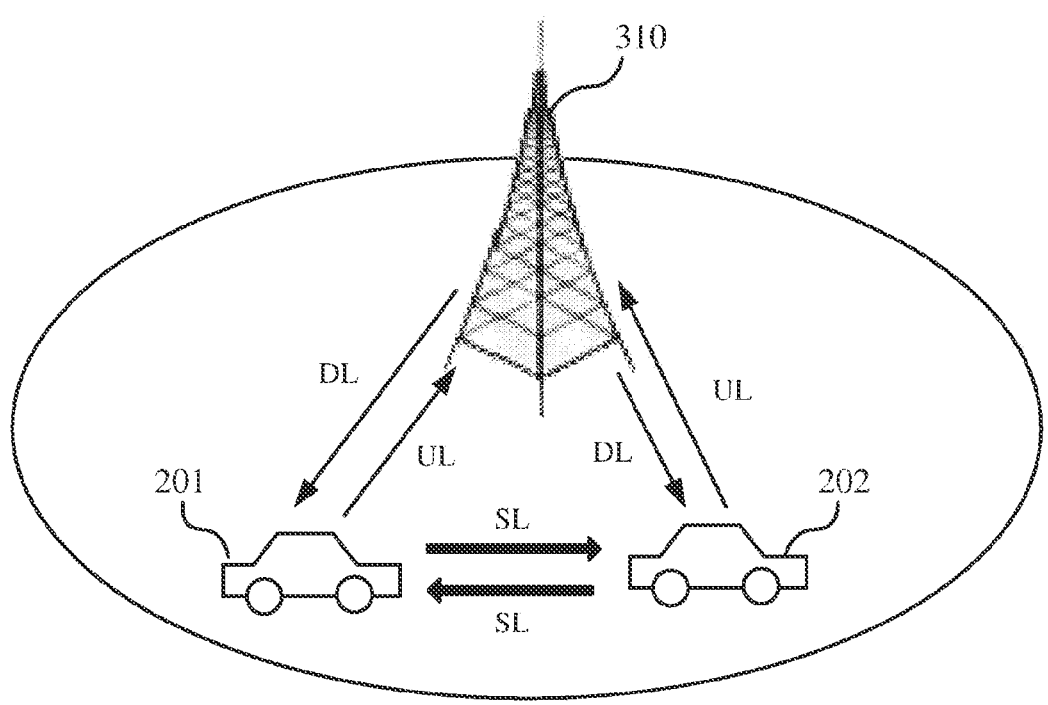
FIG. 3 schematically shows another exemplary scenario of sidelink transmission and reception in NR.

For example, in order to facilitate understanding, FIG. 3 schematically shows another exemplary scenario of sidelink transmission and reception in NR. Similarly with FIG. 2, in FIG. 3, communication may be performed between two vehicles 201 and 202 via sidelinks as shown by two thick arrows noted as "SL", and the UE 100 shown in FIG. 1 may be the vehicle 201 and another user equipment communicating with the UE 100 may be the vehicle 202, and vice versa. For the purpose of avoiding redundancy, the same contents with that in FIG. 2 will not be described again. Different from FIG. 2, in FIG. 3, there is further a BS 310 and the two vehicles 201 and 202 are both in the coverage of the BS 310. Uu communication may also be performed between each of the two vehicles 201 and 202 and the BS 310 as shown by respective thin arrows noted as "DL" or "UL".

FIG. 3 shows an exemplary scenario in which sidelink transmission and reception and Uu communication coexists in NR. For example, the BWP assigned for sidelink transmission and reception in the carrier is used for sidelink only, that is to say, will not be shared with Uu communication. And, as described above, dynamic BWP switching is not supported for the sidelink transmission and reception. In addition, another BWP is assigned for Uu communication in the same carrier. For example, assuming the vehicle 201 as the UE 100, another BWP in the carrier may be assigned for the signaling between the vehicle 201 and the BS 310. Furthermore, more BWPs may be assigned for the signaling between the vehicle 201 and the BS 310, and dynamical BWP switching can still be supported within these BWPs assigned for Uu communication.

Figure 4:
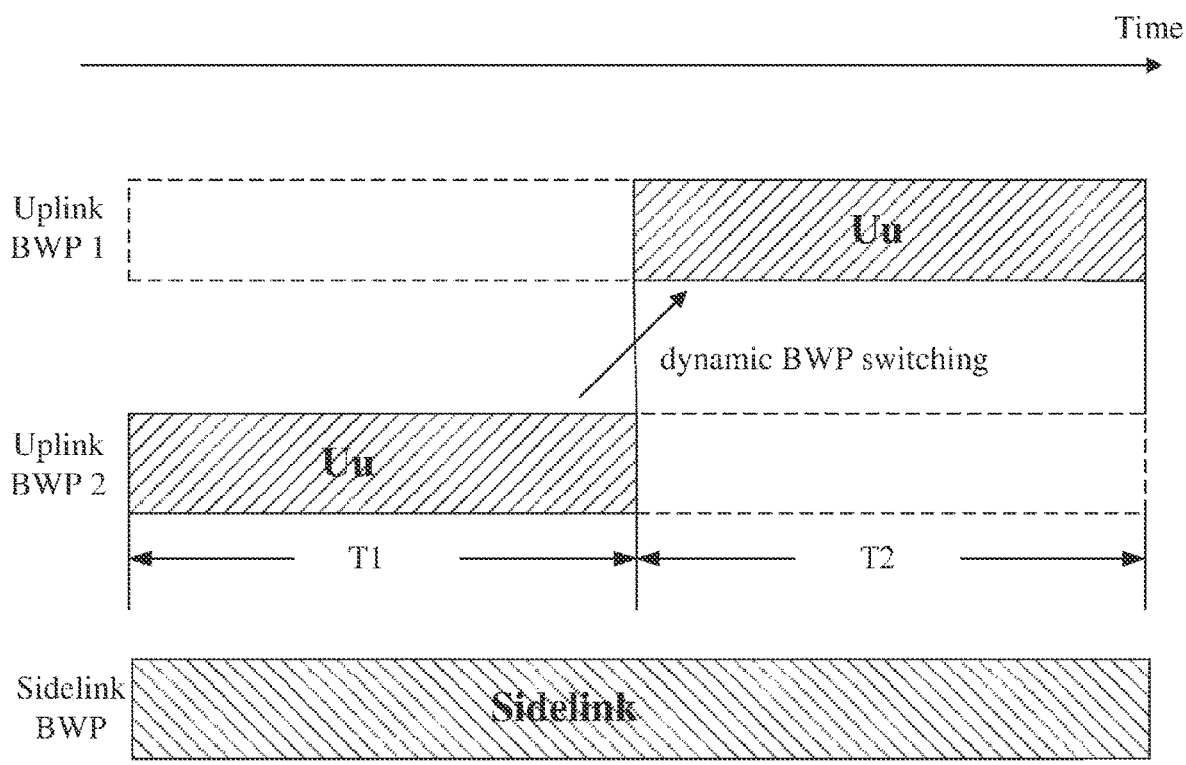
FIG. 4 schematically shows an exemplary scenario of BWP assignment for both sidelink and Uu according to an embodiment of the present disclosure.

For example, FIG. 4 schematically shows an exemplary scenario of BWP assignment for both sidelink and Uu according to an embodiment of the present disclosure. FIG. 4 shows an example of BWP assignment for both sidelink and Uu in a same uplink carrier in a Frequency Division Duplexing (FDD) case. As shown in FIG. 4, two BWPs, i.e. Uplink BWP 1 and Uplink BWP 2, are assigned for Uu communication and can be dynamically switched between each other, while one BWP, i.e. Sidelink BWP, is assigned for sidelink transmission and reception only. Uplink BWP 1, Uplink BWP 2 and Sidelink BWP are within the same carrier. Such carrier may correspond to a licensed carrier in which sidelink and Uu may coexist.

Here, Uplink BWP 1 and Uplink BWP 2 may also be considered as Uu BWPs which mean BWPs for eMBB traffic, URLLC traffic or the like.

With the above configuration in the present disclosure, Uu communication and sidelink communication have no impact to each other in the same carrier, meanwhile the sidelink receiver design is simplified and Uu operation in uplink such as dynamic BWP switching is not influenced.

According to an embodiment of the present disclosure, in the UE 100 as shown in FIG. 1, the BWP and the other BWP are active in the carrier at the same time.

For example, as shown in FIG. 4, during the first time duration T1, Sidelink BWP and Uplink BWP 2 are active, and during the second time duration T2, Sidelink BWP and Uplink BWP 1 are active.

Thus, in the present disclosure, more than one BWPs may be active in an uplink carrier at one time to support sidelink and Uu coexistence.

According to an embodiment of the present disclosure, in the UE 100 as shown in FIG. 1, the BWP and the other BWP are associated with the same Downlink (DL) BWP in the carrier.

For example, in a FDD case, one UL BWP is paired with one DL BWP. In contrast, in the present disclosure, since multiple BWPs may be active at one time as described above, multiple BWPs may be associated with the same DL BWP in the carrier.

Figure 5:
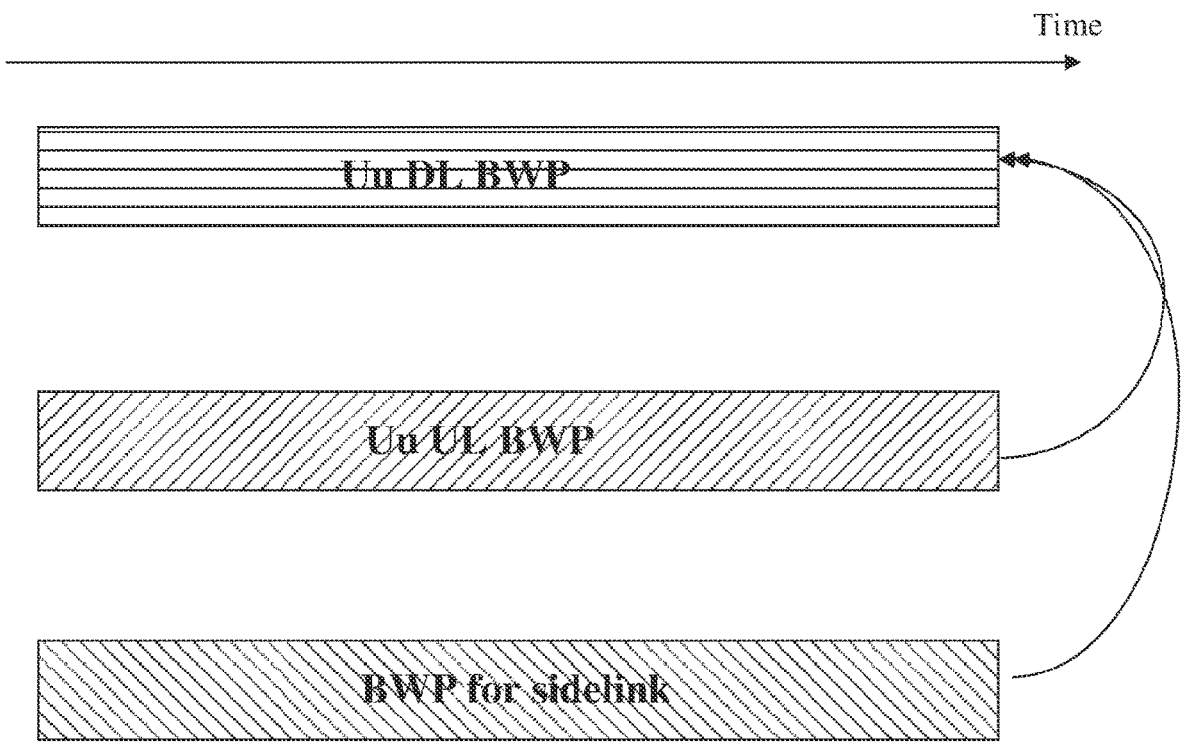
FIG. 5 schematically shows an exemplary scenario of the association between uplink/sidelink BWP and downlink BWP according to an embodiment of the present disclosure.

For example, FIG. 5 schematically shows an exemplary scenario of the association between uplink/sidelink BWP and downlink BWP according to an embodiment of the present disclosure. FIG. 5 corresponds to a FDD case. As shown in FIG. 5, Uu UL BWP and BWP for sidelink are in the same uplink carrier and are both associated with the same Uu DL BWP as indicated by two curved arrows. For example, both UL grant for scheduling resources in Uu UL BWP and sidelink grant for scheduling sidelink resources may be transmitted in this Uu DL BWP. Here, sidelink transmission and reception may be gNB based scheduling transmission, for example.

Figure 6:
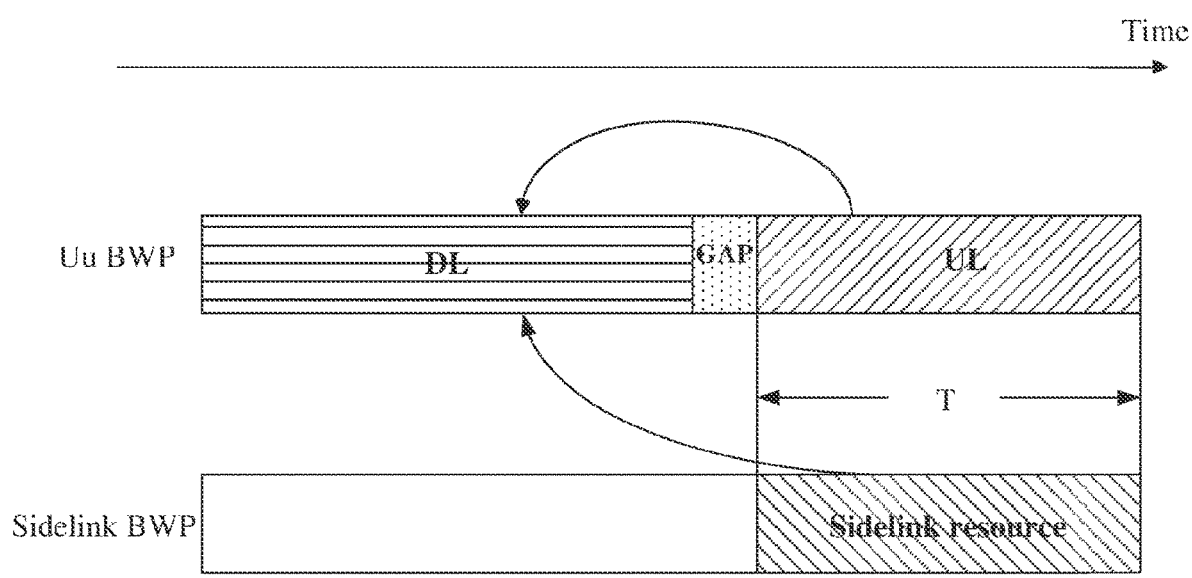
FIG. 6 schematically shows another exemplary scenario of the association between uplink/sidelink BWP and downlink BWP according to an embodiment of the present disclosure.

Although FIG. 5 shows a FDD case, the present disclosure is not limited thereto. FIG. 6 schematically shows another exemplary scenario of the association between uplink/sidelink BWP and downlink BWP according to an embodiment of the present disclosure. FIG. 6 corresponds to a Time Division Duplexing (TDD) case. It is well known that a same BWP is operated for both UL and DL in a TDD case. For example, as shown in FIG. 6, Uu BWP and sidelink BWP are in a same carrier. Uu BWP is assigned for both UL and DL transmission, and UL and DL uses Uu BWP in a time division manner. For example, there may be a gap between the time duration for DL and the time duration for UL, as shown by box filled with points and noted with "GAP" in FIG. 6.

In this case, both sidelink BWP and Uu UL BWP (i.e. UL in Uu BWP) are associated with the same Uu DL BWP (i.e. DL in Uu BWP) as indicated by the two curved arrows.

Similarly with the FDD case shown in FIG. 5, in the TDD case, both UL grant for scheduling resources in Uu UL BWP and sidelink grant for scheduling sidelink resources may be transmitted in the Uu DL BWP. Here, sidelink transmission and reception may be gNB based scheduling transmission, for example.

In addition, when Uu is switched to another BWP, sidelink BWP may also be associated to DL in that BWP.

According to an embodiment of the present disclosure, in the UE 100 as shown in FIG. 1, a sidelink duration in a slot in the BWP is changed with a change of a slot format in the other BWP in a case of Time Division Duplexing (TDD).

For example, as shown in FIG. 6, on Uu BWP, the ratio of DL duration to UL duration in a slot may be changed, that is, the UL duration T may be changed. Correspondingly, the duration of sidelink resource in the slot on sidelink BWP will be changed with the change of the UL duration so as to align with the UL duration.

According to an embodiment of the present disclosure, in the UE 100 as shown in FIG. 1, whether to transmit a first channel in a BWP or receive a second channel on another BWP is decided based on priorities of the first channel and the second channel.

For example, this is on solving the half duplex issue. As described above, when sidelink communication and Uu communication coexist in a carrier, two BWP, respectively for sidelink and Uu, may be active at the same time. However, in this case, UE's reception or transmission may be restricted by the half duplex. According to the present disclosure, whether UE transmits one channel or receives another channel may be based on two channel's priority, for example, UE should drop the channel with lower priority. Here, the priority may be related with traffic priority, content priority and so on.

For example, it is assumed that UE needs to receive a sidelink signal on one BWP in a carrier while transmitting a Uu signal on another BWP in the same carrier and that sidelink always has a higher priority. In this case, UE should drop the Uu signal and receive the sidelink signal. It is noted that this example is only for the purpose of illustration and the present disclosure is not limited thereto.

According to an embodiment of the present disclosure, in the UE 100 as shown in FIG. 1, which one of a first channel on a BWP and a second channel on another BWP is to be transmitted is decided based on priorities of the first channel and the second channel when a Power Spectrum Density (PSD) difference between the first channel and the second channel is greater than a threshold.

For example, this is on solving the PSD difference issue. As described above, when sidelink communication and Uu communication coexist in a carrier, two BWP, respectively for sidelink and Uu, may be active at the same time. However, when UE needs to transmit one channel on a sidelink BWP and another channel on a Uu BWP at the same time, UE may meet a case that the PSD difference between the two channels is too large, for example, greater than a certain threshold. According to the present disclosure, which one of the two channels is to be transmitted may be based on two channel's priority, for example, UE should drop the channel with lower priority. Here, the priority may be related with traffic priority, content priority and so on.

For example, it is assumed that UE needs to transmit a sidelink signal on one BWP in a carrier while transmitting a Uu signal on another BWP in the same carrier and that sidelink always has a higher priority. In this case, UE should drop the Uu signal and transmits the sidelink signal. It is noted that this example is only for the purpose of illustration and the present disclosure is not limited thereto.

As described before, how to configure the resource for sidelink transmission and reception in NR is unclear so far. The concept of resource pool is adopted to implement resource configuration for sidelink communication in LTE V2X and the concept of BWP is adopted to implement resource configuration in NR. However, reusing both existing BWP and resource pool signaling seems to be a redundant (at least in frequency) and complicated signaling design on sidelink resource.

In view of the above, according to an embodiment of the present disclosure, in the UE 100 as shown in FIG. 1, the BWP is configured by a BWP configuration signaling in which a bitmap indicating a time domain resource for the sidelink transmission and reception is included.

For example, first, in order to configure sidelink specific BWP, for example, sidelink specific fields in LTE resource pool may be added to BWP configuration signaling to indicate frequency and other information on NR sidelink (for example, taking Rel. 14 field as the example). Basically, sidelink specific BWP may be configured as shown in FIG. 4 for example. Furthermore, a bitmap is added to the BWP configuration signaling to indicate the time domain resource on sidelink. In this way, resource pool configuration on sidelink is not needed. For example, the following codes show an example of the BWP configuration signaling.

```
BandwidthPart ::=                    SEQUENCE {
  bandwidthPartId                      BandwidthPartId,
  location                             INTEGER (0..maxNrofPhysicalResourceblocksTimes4)   OPTIONAL
  bandwidth                            INTEGER (0..maxNrofPhysicalResourceblocks)         OPTIONAL
  subcarrierSpacing                    ENUMERATED {N0, N1, N2, N3, N4}                    OPTIONAL
  cyclicPrefix                         ENUMERATED {extended}                              OPTIONAL
  directCurrentLocation                INTEGER (0..3299)                                  OPTIONAL
  adjacencyPSCCH-PSSCH-r14             BOOLEAN,
  sizeSubchannel-r14                   ENUMERATED {{
                                         n4, n5, n6, n8, n9, n10, n12, n15, n16, n18, n20, n25,
                                         n30, n48, n50, n72, n75, n96, n100, spare13, spare12,
                                         spare11, spare10, spare9, spare8, spare7, spare6,
                                         spare5, spare4, spare3, spare2, spare1},
  numSubchannel-r14                    ENUMERATED {n1, n3, n5, n8, n10, n15, n20, spare1},
  rxParametersNCell-r14                SEQUENCE {
    tdd-Config-r14                     TDD-Config                         OPTIONAL,        -- Need OP
    syncConfigIndex-r14                INTEGER {0..15} }
  }                                                                       OPTIONAL,        -- Need OR
  dataTxParameters-r14                 SL-TxParameters-r12                OPTIONAL,        -- CondTx
  zoneID-r14                           INTEGER (0..7)                     OPTIONAL,        -- Need OR
  threshS-RSSI-CBR-r14                   INTEGER (0..45)                    OPTIONAL,        -- Need OR
  poolReportID-r14                     SL-V2X-TxPoolReportIdentity-r14      OPTIONAL,        -- Need OR
  cbr-pssch-TxConfigList-r14           SL-CBR-PPPP-TxConfigList-r14         OPTIONAL,        -- Need OR
  resourceSelectionConfigP2X-r14       SL-P2X-ResourceSelectionConfig-r14   OPTIONAL,        -- Cond P2X
  syncAllowed-r14                      SL-SyncAllowed-r14                   OPTIONAL,        -- Need OR
  restrictResourceReservationPeriod-r14  SL-RestrictResourceReservationPeriodList-r14
  ...
}
```

In the above exemplary codes, LTE resource pool related field is included in NR BWP configuration, as shown by bolded codes at the last several lines. It is noted that, the above exemplary codes are only for the purpose of illustration, the present disclosure is not limited thereto, and those skilled in the art may write different codes according specific requirements.

In addition, when the UE 100 is in coverage of a BS (for example, the BS 310 as shown in FIG. 3), the BWP configuration signaling may be received from the BS and the one BWP is configured by the BWP configuration signaling from the BS. Otherwise, when the UE 100 is out of coverage of a BS, that is, cannot receive the BWP configuration signaling from the BS, the one BWP may be preconfigured by the operator. For example, the operator may set the BWP configuration signaling and store it in the UE in advance when designing the UE. Thus, in this case, the UE does not need to receive the BWP configuration signaling from the BS.

With the above BWP configuration signaling, there is less impact on NR protocol in the present disclosure.

Although the above embodiments are described taking BWP as the form of sidelink resource, the present disclosure is not limited thereto. For example, in an unlicensed carrier case as described above, one BWP may be equivalent to one carrier. In other words, in an unlicensed carrier case, there may be not BWP configuration any more. In this case, in the UE 100 as shown in FIG. 1, the BWP is configured by a resource pool configuration signaling in which BWP specific information is included.

For example, the principle of resource pool signaling in LTE V2X may be reused. NR BWP specific information like subcarrier spacing may be directly indicated in the resource pool configuration signaling. For example, the following codes show an example of the resource pool configuration signaling.

interpreted as resource pool ID, or such field is not present. Furthermore, the exemplary design of the sidelink resource configuration signaling can be applied for both Uu and ITS carriers as well as both normal resource (for example, BWP or resource pool) and exceptional resource for sidelink operation. In addition, different sidelink resources may have different Cyclic Prefix (CP)/subcarrier spacing.

In the above, the UE 100 is described in detail with reference to FIGS. 1-6. With the UE 100, since dynamic BWP switching is not supported for sidelink transmission and reception, the complexity of the receiver design may be reduced and the system performance may be improved.

In another embodiment of the present disclosure, there is provided a user equipment comprising: circuitry operative to determine a Bandwidth Part (BWP) assigned for sidelink transmission and reception in a carrier; and a transceiver operative to perform the sidelink transmission and reception

```
SL-CommResourcePoolV2X-r14 ::=   SEQUENCE {
   sl-OffsetIndicator-r14          SL-OffsetIndicator-r12                  OPTIONAL,     -- Need OR
   sl-Subframe-r14                 SubframeBitmapSL-r14,
   adjacencyPSCCH-PSSCH-r14        BOOLEAN,
   sizeSubchannel-r14              ENUMERATED {
                                   n4, n5, n6, n8, n9, n10, n12, n15, n16, n18, n20, n25,
                                   n30, n48, n50, n72, n75, n96, n100, spare13, spare12,
                                   spare11, spare10, spare9, spare8, spare7, spare6, spare5,
                                   spare4, spare3, spare2, spare1},
   numSubchannel-r14               ENUMERATED {n1, n3, n5, n8, n10, n15, n20, spare1},
   startRB-Subchannel-r14          INTEGER (0..99),
   startRB-PSCCH-Pool-r14          INTEGER (0..99)                         OPTIONAL,     -- Need OR
   rxParametersNCell-r14           SEQUENCE {
   tdd-Config-r14                  TDD-Config                              OPTIONAL,     -- Need OP
   syncConfigIndex-r14             INTEGER (0..15)
                                                                           OPTIONAL,     -- Need OR
   }
   dataTxParameters-r14            SL-TxParameters-r12                     OPTIONAL,     -- Cond Tx
   zoneID-r14                      INTEGER (0..7)                          OPTIONAL,     -- Need OR
   threshS-RSSI-CBR-r14            INTEGER (0..45)                         OPTIONAL,     -- Need OR
   poolReportId-r14                SL-V2X-TxPoolReportIdentity-r14         OPTIONAL,     -- Need
OR
   cbr-pssch-TxConfigList-r14      SL-CBR-PPPP-TxConfigList-r14            OPTIONAL,     -- Need OR
   resourceSelectionConfigP2X-r14  SL-P2X-ResourceSelectionConfig-r14      OPTIONAL,     -- Cond
P2X
   syncAllowed-r14                 SL-SyncAllowed-r14                      OPTIONAL,     -- Need OR
   restrictResourceReservationPeriod-r14   SL-RestrictResourceReservationPeriodList-r14
   OPTIONAL,-- Need OR
   subcarrierSpacing               ENUMERATED { n0, n1, n2, n3, n4 }
   . . .
}
```

In the above exemplary codes, NR BWP related field is included in the resource pool configuration, as shown by bolded codes at the last line. It is noted that, the above exemplary codes are only for the purpose of illustration, the present disclosure is not limited thereto, and those skilled in the art may write different codes according specific requirements. Thus, signaling design and UE behavior may be simplified.

Similarly, when the UE 100 is in coverage of a BS (for example, the BS 310 as shown in FIG. 3), the resource pool configuration signaling may be received from the BS. Otherwise, when the UE 100 is out of coverage of a BS, the one BWP may be preconfigured by the operator. For example, the operator may set the resource pool configuration signaling and store it in the UE in advance when designing the UE. Thus, in this case, the UE does not need to receive the resource pool configuration signaling from the BS.

The above exemplary design of the sidelink resource configuration signaling can be applied for both gNB scheduling based transmission mode and UE autonomous based transmission mode. For example, in case of gNB scheduling based transmission mode, BWP ID in sidelink grant can be on the determined BWP in the carrier, wherein more than one BWPs are active in the carrier at the same time.

For example, compared with current NR supporting only on active BWP at one time in an uplink/downlink carrier, in the user equipment according to the present embodiment of the disclosure, more than one BWPs may be active in an uplink carrier at one time.

It is noted that, different from the UE 100 as shown in FIG. 1, in the user equipment according the present embodiment, there is no limitation that dynamic BWP switching is not supported for the sidelink transmission and reception, that is to say, dynamic BWP switching may or may not be supported for the sidelink transmission and reception based on specific situations in the present embodiment.

According to an embodiment of the present disclosure, the more than one BWPs comprise the BWP assigned for sidelink transmission and reception in the carrier and another BWP assigned for transmission between the user equipment and a base station in the carrier.

For example, one BWP dedicated for sidelink transmission and reception and another BWP dedicated for uplink communication may be active in an uplink carrier at one time, so that sidelink and Uu may coexist in an uplink carrier.

Figure 7:
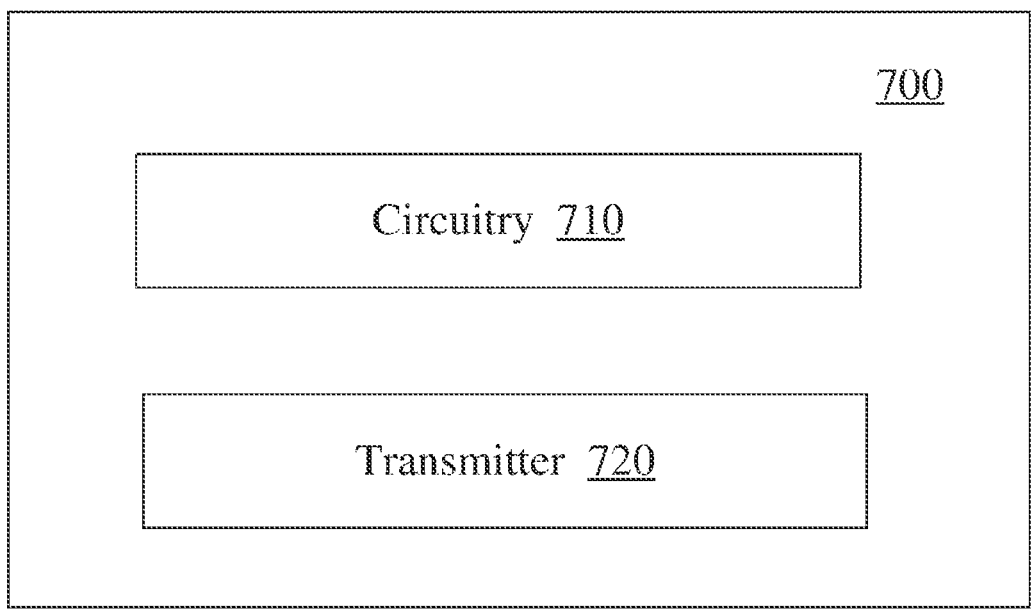
FIG. 7 illustrates a block diagram of a part of a base station according to an embodiment of the present disclosure.

In another embodiment of the present disclosure, there is provided a base station as shown in FIG. 7. FIG. 7 illustrates a block diagram of a part of a base station 700 according to an embodiment of the present disclosure. As shown in FIG. 7, the BS 700 may comprise circuitry 710 and a transmitter 720. The circuitry 710 is operative to generate a Bandwidth Part (BWP) configuration signaling in which a bitmap indicating a time domain resource for sidelink transmission and reception is included. The transmitter 720 is operative to transmit the BWP configuration signaling to a user equipment. A BWP assigned for the sidelink transmission and reception in a carrier is determined by the user equipment based on the BWP configuration signaling, and dynamic BWP switching is not supported for the sidelink transmission and reception in the carrier.

For example, BS 700 may be BS 310 as shown in FIG. 3 and the user equipment may be the UE 100 as shown in FIG. 1 and the vehicle 201 as shown in FIG. 3. As described above, when the UE 100 in coverage of the BS 700, the UE 100 may receive the BWP configuration signaling from the BS 700 and determines the BWP assigned for the sidelink transmission and reception in the carrier based on the BWP configuration signaling.

According to an embodiment of the present disclosure, the BWP is used for the sidelink transmission and reception only, and another BWP is assigned for transmission between the user equipment and the base station in the carrier, and the transmitter 720 is further operative to transmit a downlink signal on a Downlink (DL) BWP in the carrier to the user equipment.

For example, as described above with reference to FIG. 3, the vehicle 201 may perform Uu communication with the BS 310 and perform sidelink transmission and reception with the vehicle 202.

With the BS 700, since dynamic BWP switching is not supported for sidelink transmission and reception, the complexity of the receiver design may be reduced and the system performance may be improved. In addition, with the BWP configuration signaling, there is less impact on NR protocol in the present disclosure.

Figure 8:
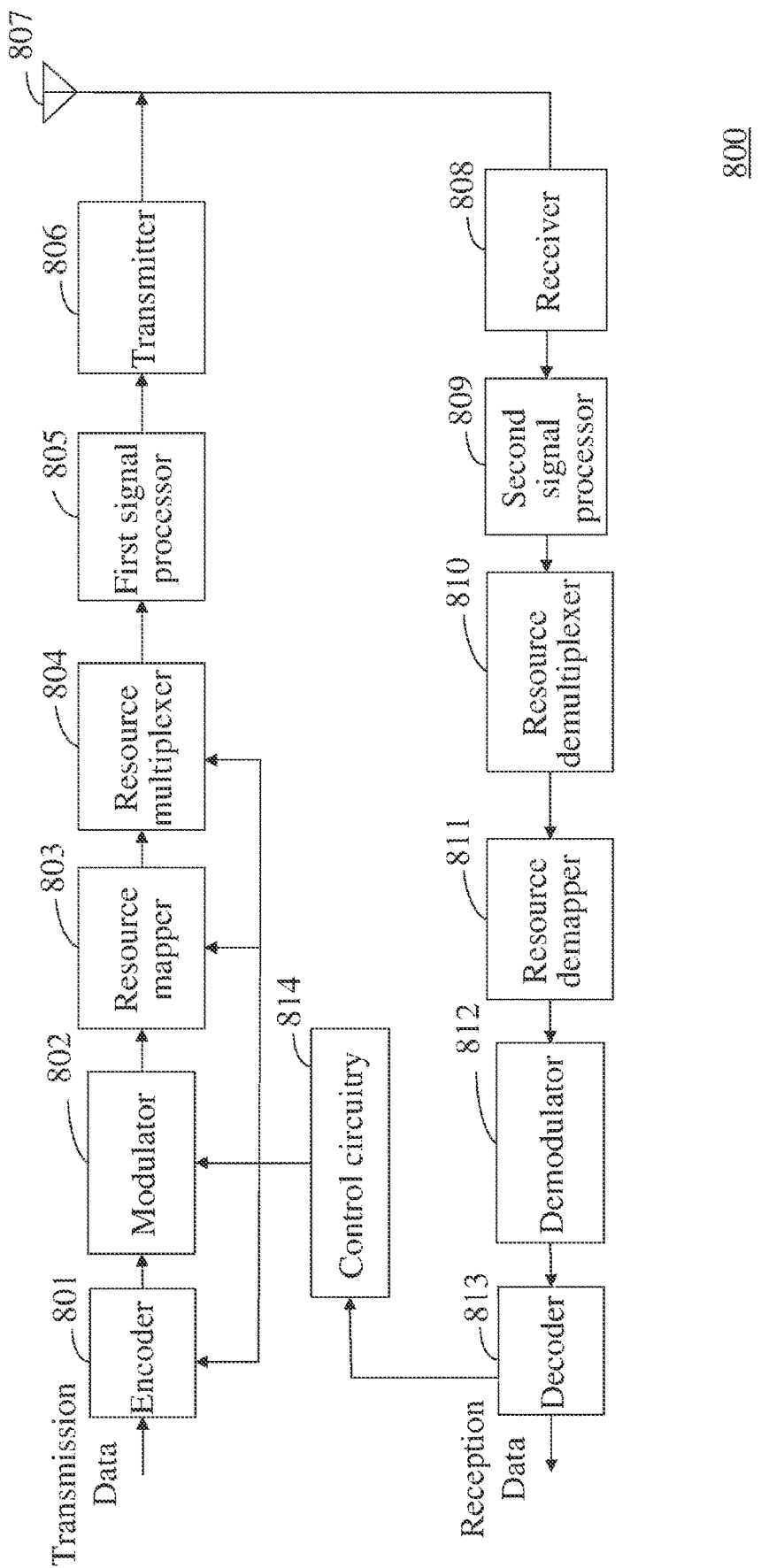
FIG. 8 illustrates a block diagram of details of a user equipment according to an embodiment of the present disclosure.

FIG. 8 illustrates a block diagram of details of a user equipment 800 according to an embodiment of the present disclosure. As shown in FIG. 8, the UE 800 includes a encoder 801, a modulator 802, a resource mapper 803, a resource multiplexer 804, a first signal processor 805, a transmitter 806, an antenna 807, a receiver 808, a second signal processor 809, a resource demultiplexer 810, a resource demapper 811, a demodulator 812, a decoder 813 and a control circuitry 814.

For example, the encoder 801 performs encoding processing on transmission data, and the modulator 802 performs modulation processing on post-encoding transmission data to generate a data symbol. The resource mapper 803 maps the data symbol onto physical resources. For example, when the transmission data belongs to sidelink data to be transmitted to another UE, the resource mapper 803 maps the data symbol onto BWP assigned for sidelink transmission and reception. The resource multiplexer 804 multiplexes the data symbol and possible control information and/or synchronization information. The first signal processor 805 performs the signal processing on the multiplexed signal output from the resource multiplexer 804. The transmitter 806 transmits the processed sidelink signal to for example another UE via the antenna 807.

Here, the operations of the encoder 801, the modulator 802, the resource mapper 803 and the resource multiplexer 804 are controlled by the control circuitry 814. For example, the control circuitry 814 may determine a BWP assigned for sidelink transmission and reception in a carrier. The resource mapper 803 maps the sidelink data symbol onto the determined BWP and the transmitter 806 transmits the sidelink signal on the determined BWP in the carrier to another UE. The control circuitry 814 may also controls dynamic switching for sidelink transmission and reception. In this disclosure, dynamic switching is not supported for the sidelink transmission and reception.

In addition, the receiver 808 may receive a sidelink signal from another UE via the antenna 807. The second signal processor 809 performs the signal processing on the sidelink signal received by the receiver 808. The resource demultiplexer 810 demultiplexes the processed sidelink signal into sidelink data and possible sidelink control information and/or synchronization information. The resource demapper 811 demaps sidelink data symbol and possible sidelink control information and/or synchronization information from physical resources, for example, a BWP assigned for sidelink transmission and reception. The demodulatoer 812 performs demodulation processing on the sidelink data symbol and the decoder 813 performs decoding processing on the demodulated sidelink data symbol to obtain the reception data. In addition, the demodulatoer 812 may also performs demodulation processing on possible sidelink control information and/or synchronization information and the decoder 813 performs decoding processing on the demodulated sidelink control information and/or synchronization information so as to output the sidelink control information and/or synchronization information to the control circuitry 814 for controlling sidelink transmission and reception.

The above case may correspond to unlicensed carrier case, as described before, in which there is no Uu communication, however, the present disclosure is not limited thereto. In a licensed carrier case, the UE 800 may transmit uplink signals to a base station (for example, the BS 310 shown in FIG. 3) through the encoder 801, the modulator 802, the resource mapper 803, the resource multiplexer 804, the first signal processor 805, the transmitter 806, the antenna 807 and the control circuitry 814. For example, the control circuitry 814 may determine another BWP assigned for transmission between the UE 800 and the base station in the carrier and control the resource mapper 803 correspondingly. The transmitter 806 transmits the UL signal on the other BWP assigned for transmission between the UE 800 and the BS in the carrier to the BS via the antenna 807.

Furthermore, as described above, the control circuitry 814 may determine more than one BWP assigned for transmission between the UE 800 and the base station in the carrier and control the resource mapper 803 correspondingly. The transmitter 806 transmits the UL signal on one of the more than one BWP assigned for transmission between the UE 800 and the BS in the carrier to the BS via the antenna 807. Dynamic BWP switching is supported within these BWPs.

Similarly, in a licensed carrier case, the UE 800 may also receive downlink signals from a base station (for example, the BS 310 shown in FIG. 3) through the antenna 807, the receiver 808, the second signal processor 809, the resource demultiplexer 810, the resource demapper 811, the demodulator 812 and the decoder 813. Since the principle of receiving DL signals from a BS is well known to those skilled in the art, detailed description will not be provided in order to avoid redundancy.

Note that, the user equipment 800 shown in FIG. 8 may function as UE 100 as shown in FIG. 1. Specifically, the combination of the transmitter 806 and the receiver 808 may correspond to the transceiver 120. The circuitry 110 may include the encoder 801, the modulator 802, the resource mapper 803, the resource multiplexer 804, the first signal processor 805, the second signal processor 809, the resource demultiplexer 810, the resource demapper 811, the demodulator 812, the decoder 813 and the control circuitry 814. Alternatively, one or more of these units may also be separated from the circuitry 110 depending on specific requirements.

Figure 9:
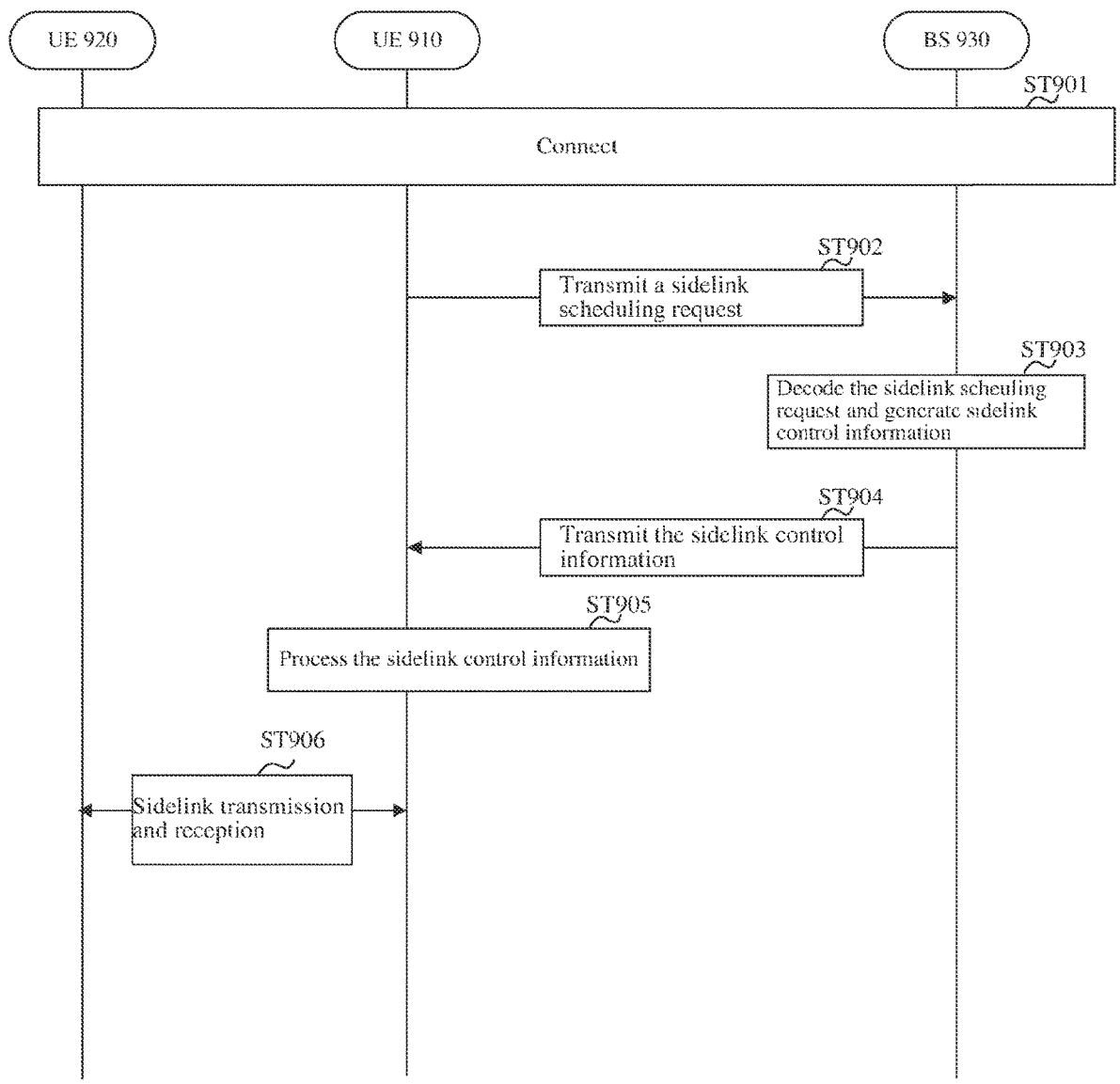
FIG. 9 schematically shows an example of a flowchart of communication among a base station and two user equipments according to an embodiment of the present disclosure.

FIG. 9 schematically shows an example of a flowchart of communication among a BS 930 and UEs 910, 920 according to an embodiment of the present disclosure. For example, the BS 930 may be the BS 700 as shown in FIG. 7, and the UE 910 may be the UE 100 as shown in FIG. 1 or the UE 800 shown in FIG. 8.

For example, FIG. 9 may correspond to a case that the UEs 910 and 920 are in coverage of the BS 930, which is similarly to that shown in FIG. 3. That is to say, the UEs 910 and 920 may correspond to the vehicles 201 and 202 respectively, and the BS 930 may correspond to the BS 310.

As shown in FIG. 9, at a step ST901, the UEs 910, 920 and the BS 930 may connect with each other in a connection procedure. The connection may be established by implementing known or future developed method whose details are omitted herein.

At a step ST902, the UE 910 may transmit a sidelink scheduling request to the BS 930. Then, at a step ST903, the BS 930 decodes the sidelink scheduling request received from the UE 910 and generates sidelink control information. For example, as described above, the sidelink control information may include a BWP configuration signaling for configuring BWP dedicated for sidelink transmission and reception in a carrier.

At a step ST904, the BS 930 transmits the generated sidelink control information to the UE 910. Then, at a step ST905, the UE 910 processes the sidelink control information received from the BS 930. For example, the UE 910 may determine the BWP dedicated for sidelink transmission and reception in a carrier based on the BWP configuration signaling received from the BS 930.

At a step ST906, the UE 910 and the UE 920 may perform sidelink transmission and reception between each other on the BWP dedicated for sidelink transmission and reception in a carrier.

It is noted that, although not shown in FIG. 9, the UE 910 and/or the UE 920 may further perform signal interaction with the BS 930 on BWPs assigned for uplink and downlink transmission. For example, the UE 910 may transmit a scheduling request for Uu to the BS 930 and receive control information for Uu from the BS 930. Since the uplink and downlink communication between a UE and a BS are well known to those skilled in the art, they will not be discussed herein.

Figure 10:
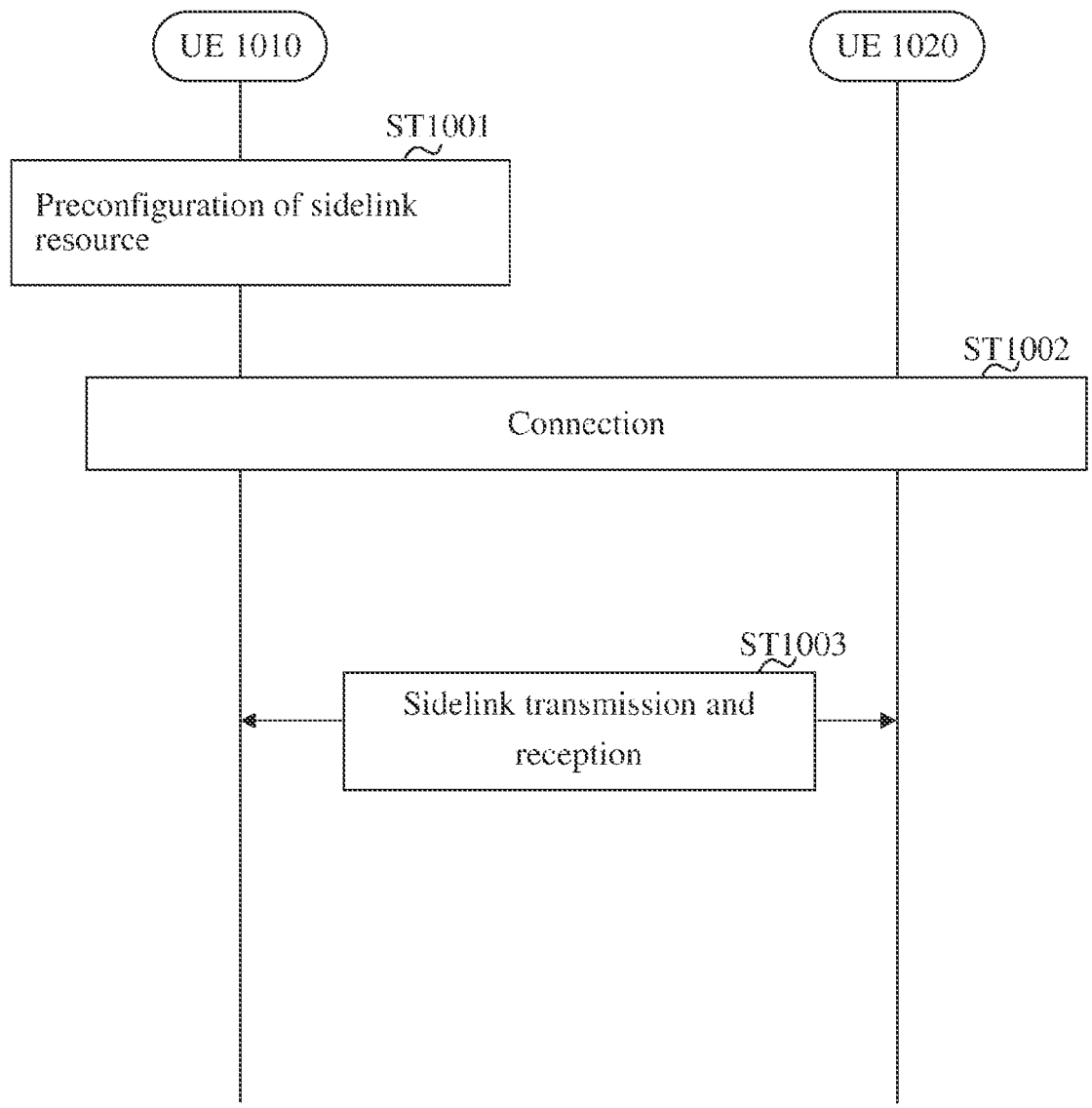
FIG. 10 schematically shows an example of a flowchart of communication between two user equipments according to an embodiment of the present disclosure.

FIG. 10 schematically shows an example of a flowchart of communication between a UE 1010 and a UE 1020 according to an embodiment of the present disclosure. For example, the UE 1010 may be the UE 100 as shown in FIG. 1 or the UE 800 shown in FIG. 8.

For example, FIG. 10 may correspond to a case that the UEs 1010 and 1020 are out of coverage of any BS, which is similarly to that shown in FIG. 2. That is to say, the UEs 1010 and 1020 may correspond to the vehicles 201 and 202 shown in FIG. 2 respectively.

As described above, in a case of out of coverage of any BS, the UE 1010 cannot receive any control information including sidelink resource configuration signaling from any BS. In this case, the UE 1010 should preconfigure sidelink resource before performing sidelink transmission and reception with another UE. As shown in FIG. 10, at a step ST1001, the UE 1010 preconfigures sidelink resource. For example, the BWP dedicated for sidelink transmission and reception in a carrier may be preconfigured by the operator. For example, the operator may set the BWP configuration signaling and store it in the UE1010 in advance when designing the UE, and the UE 1010 may determine the BWP dedicated for sidelink transmission and reception in a carrier based on the BWP configuration signaling.

At a step ST1002, the UE 1010 may connect with the UE 1020 in a connection procedure. The connection may be established by implementing known or future developed method whose details are omitted herein.

At a step ST1003, the UE 1010 and the UE 1020 may perform sidelink transmission and reception between each other on the BWP dedicated for sidelink transmission and reception in a carrier.

Noted that, it is also possible that there is no step ST1002 here, since the connection procedure is not necessary during sidelink transmission and reception and two user equipments may also perform communication directly between each other without any connection procedure.

Figure 11:
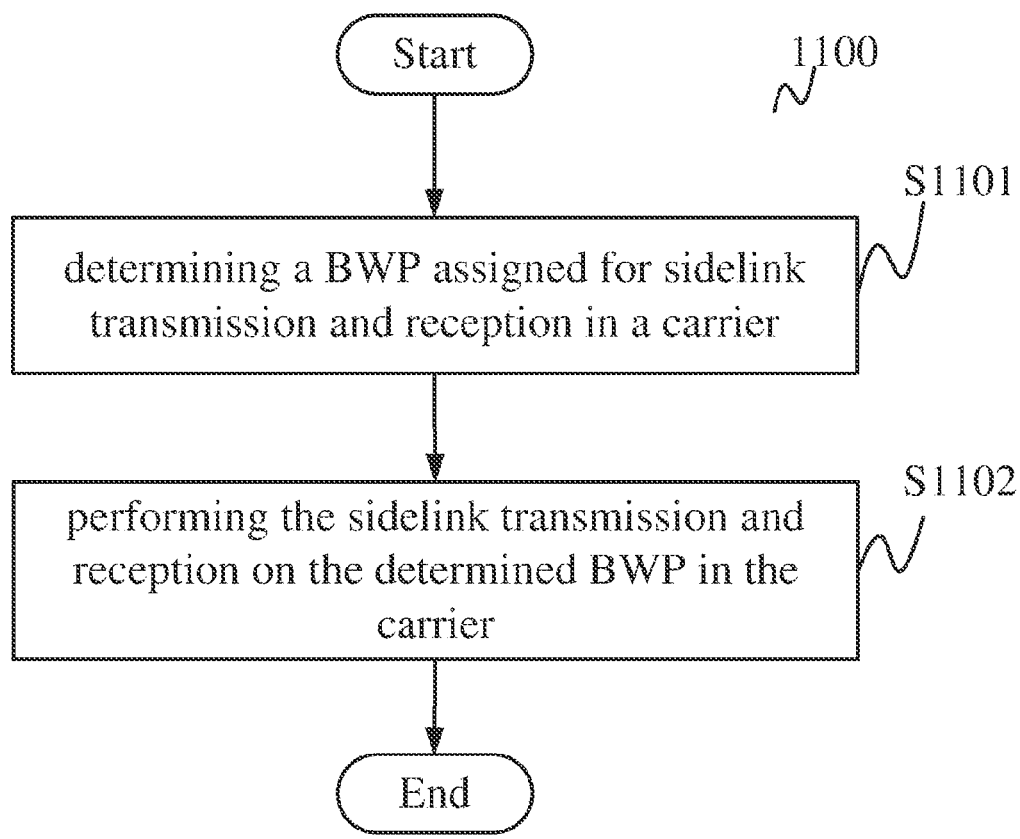
FIG. 11 illustrates a flowchart of a wireless communication method for a user equipment according to an embodiment of the present disclosure.

In a further embodiment of the present disclosure, there is provided a wireless communication method for a user equipment as shown in FIG. 11. FIG. 11 illustrates a flowchart of a wireless communication method 1100 for a user equipment according to an embodiment of the present disclosure. For example, the wireless communication method 1100 may be applied to the UE 100/800 as shown in FIGS. 1 and 8.

As shown in FIG. 11, the wireless communication method 1100 starts at a step S1101 in which a BWP assigned for sidelink transmission and reception in a carrier is determined. Then, at a step S1102, the sidelink transmission and reception is performed on the determined BWP in the carrier. Dynamic BWP switching is not supported for the sidelink transmission and reception in the carrier. After the step S1102, the wireless communication method 1100 is ended. For example, another user equipment performing the sidelink transmission and reception with the user equipment may be the vehicle 202 as shown in FIGS. 2 and 3.

With the wireless communication method 1100, since dynamic BWP switching is not supported for sidelink transmission and reception, the complexity of the receiver design may be reduced and the system performance may be improved.

Note that, the other technical features in the user equipment 100 as described above can also be incorporated in the wireless communication method 1100 and will not be described here for avoiding redundancy.

Figure 12:
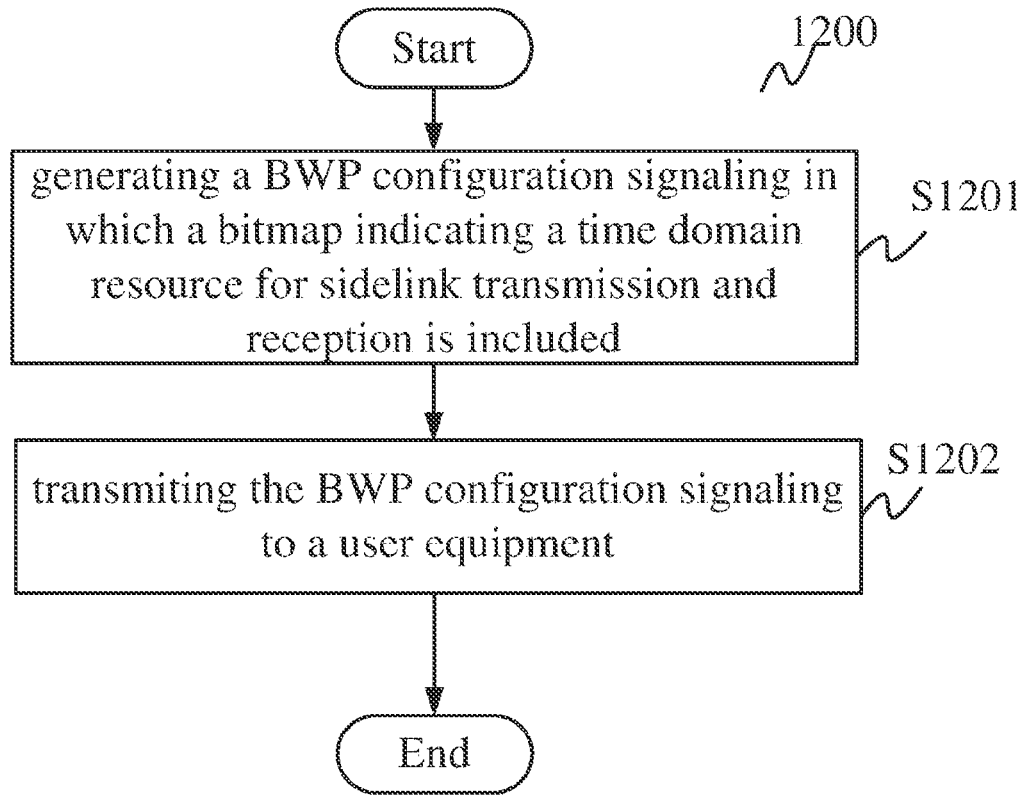
FIG. 12 illustrates a flowchart of a wireless communication method for a base station according to an embodiment of the present disclosure.

In a further embodiment of the present disclosure, there is provided a wireless communication method for a base station as shown in FIG. 12. FIG. 12 illustrates a flowchart of a wireless communication method 1200 for a base station according to an embodiment of the present disclosure. For example, the wireless communication method 1200 may be applied to the BS 700 as shown in FIG. 7.

As shown in FIG. 12, the wireless communication method 1200 starts at a step S1201 in which a Bandwidth Part (BWP) configuration signaling in which a bitmap indicating a time domain resource for sidelink transmission and reception is included is generated. Then, at a step S1202, the BWP configuration signaling is transmitted to a user equipment. A BWP assigned for the sidelink transmission and reception in a carrier is determined by the user equipment based on the BWP configuration signaling. And, dynamic BWP switching is not supported for the sidelink transmission and reception in the carrier. After the step S1202, the wireless communication method 1200 is ended. For example, the user equipment may be the UE 100/800 as shown in FIGS. 1 and 8.

With the wireless communication method 1200, since dynamic BWP switching is not supported for sidelink transmission and reception, the complexity of the receiver design may be reduced and the system performance may be improved. In addition, with the BWP configuration signaling, there is less impact on NR protocol in the present disclosure.

Note that, the other technical features in the base station 700 as described above can also be incorporated in the wireless communication method 1200 and will not be described here for avoiding redundancy.

In a further embodiment of the present disclosure, there is provided a wireless communication method for a user equipment, comprising: determining a Bandwidth Part (BWP) assigned for sidelink transmission and reception in a carrier; and performing the sidelink transmission and reception on the determined BWP in the carrier, wherein more than one BWPs are active in the carrier at the same time.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

Embodiments of the present disclosure can at least provide the following subject matters.

(1). A user equipment, comprising:
  circuitry operative to determine a Bandwidth Part (BWP) assigned for sidelink transmission and reception in a carrier; and
  a transceiver operative to perform the sidelink transmission and reception on the determined BWP in the carrier,
  wherein dynamic BWP switching is not supported for the sidelink transmission and reception in the carrier.

(2). The user equipment according to (1), wherein the BWP is used for the sidelink transmission and reception only, and wherein another BWP is assigned for transmission between the user equipment and a base station in the carrier.

(3). The user equipment according to (2), wherein the BWP and the other BWP are active in the carrier at the same time.

(4). The user equipment according to (2), wherein the BWP and the other BWP are associated with the same Downlink (DL) BWP in the carrier.

(5). The user equipment according to (2), wherein a sidelink duration in a slot in the BWP is changed with a change of a slot format in the other BWP in a case of Time Division Duplexing (TDD).

(6). The user equipment according to (2), wherein whether to transmit a first channel in a BWP or receive a second channel on another BWP is decided based on priorities of the first channel and the second channel.

(7). The user equipment according to (2), wherein which one of a first channel on a BWP and a second channel on another BWP is to be transmitted is decided based on priorities of the first channel and the second channel when a Power Spectrum Density (PSD) difference between the first channel and the second channel is greater than a threshold.

(8). The user equipment according to (1), wherein the BWP is configured by a BWP configuration signaling in which a bitmap indicating a time domain resource for the sidelink transmission and reception is included.

(9). A wireless communication method for a user equipment, comprising:
  determining a Bandwidth Part (BWP) assigned for sidelink transmission and reception in a carrier; and
  performing the sidelink transmission and reception on the determined BWP in the carrier,
  wherein dynamic BWP switching is not supported for the sidelink transmission and reception in the carrier.

(10). The wireless communication method according to (9), wherein the BWP is used for the sidelink transmission and reception only, and wherein another BWP is assigned for transmission between the user equipment and a base station in the carrier.

(11). The wireless communication method according to (10), wherein the BWP and the other BWP are active in the carrier at the same time.

(12). The wireless communication method according to (10), wherein the BWP and the other BWP are associated with the same Downlink (DL) BWP in the carrier.

(13). The wireless communication method according to (10), wherein a sidelink duration in a slot in the BWP is changed with a change of a slot format in the other BWP in a case of Time Division Duplexing (TDD).

(14). The wireless communication method according to (10), wherein whether to transmit a first channel in a BWP or receive a second channel on another BWP is decided based on priorities of the first channel and the second channel.

(15). The wireless communication method according to (10), wherein which one of a first channel on a BWP and a second channel on another BWP is to be transmitted is decided based on priorities of the first channel and the second channel when a Power Spectrum Density (PSD) difference between the first channel and the second channel is greater than a threshold.

(16). The wireless communication method according to (9), wherein the BWP is configured by a BWP configuration signaling in which a bitmap indicating a time domain resource for the sidelink transmission and reception is included.

(17). A base station, comprising:
circuitry operative to generate a Bandwidth Part (BWP) configuration signaling in which a bitmap indicating a time domain resource for sidelink transmission and reception is included;
a transmitter operative to transmit the BWP configuration signaling to a user equipment,
wherein a BWP assigned for the sidelink transmission and reception in a carrier is determined by the user equipment based on the BWP configuration signaling, and wherein
dynamic BWP switching is not supported for the sidelink transmission and reception in the carrier.

(18). The base station according to (17), wherein the BWP is used for the sidelink transmission and reception only, and wherein another BWP is assigned for transmission between the user equipment and a base station in the carrier, and wherein
the transmitter is further operative to transmit a downlink signal on a Downlink (DL) BWP in the carrier to the user equipment.

(19). The base station according to (18), wherein the BWP and the other BWP are active in the carrier at the same time.

(20). The base station according to (18), wherein the BWP and the other BWP are associated with the same Downlink (DL) BWP in the carrier.

(21). The base station according to (18), wherein a sidelink duration in a slot in the BWP is changed with a change of a slot format in the other BWP in a case of Time Division Duplexing (TDD).

(22). The base station according to (18), wherein whether to transmit a first channel in a BWP or receive a second channel on another BWP is decided based on priorities of the first channel and the second channel.

(23). The base station according to (18), wherein which one of a first channel on a BWP and a second channel on another BWP is to be transmitted is decided based on priorities of the first channel and the second channel when a Power Spectrum Density (PSD) difference between the first channel and the second channel is greater than a threshold.

(24). A wireless communication method for a base station, comprising:
generating a Bandwidth Part (BWP) configuration signaling in which a bitmap indicating a time domain resource for sidelink transmission and reception is included;
transmitting the BWP configuration signaling to a user equipment,
wherein a BWP assigned for the sidelink transmission and reception in a carrier is determined by the user equipment based on the BWP configuration signaling, and wherein
dynamic BWP switching is not supported for the sidelink transmission and reception in the carrier.

(25). The wireless communication method according to (24), wherein the BWP is used for the sidelink transmission and reception only, and wherein another BWP is assigned for transmission between the user equipment and a base station in the carrier, and wherein
the method further comprises transmitting a downlink signal on a Downlink (DL) BWP in the carrier to the user equipment.

(26). The wireless communication method according to (25), wherein the BWP and the other BWP are active in the carrier at the same time.

(27). The wireless communication method according to (25), wherein the BWP and the other BWP are associated with the same Downlink (DL) BWP in the carrier.

(28). The wireless communication method according to (25), wherein a sidelink duration in a slot in the BWP is changed with a change of a slot format in the other BWP in a case of Time Division Duplexing (TDD).

(29). The wireless communication method according to (25), wherein whether to transmit a first channel in a BWP or receive a second channel on another BWP is decided based on priorities of the first channel and the second channel.

(30). The wireless communication method according to (25), wherein which one of a first channel on a BWP and a second channel on another BWP is to be transmitted is decided based on priorities of the first channel and the second channel when a Power Spectrum Density (PSD) difference between the first channel and the second channel is greater than a threshold.

(31). A user equipment, comprising:
circuitry operative to determine a Bandwidth Part (BWP) assigned for sidelink transmission and reception in a carrier; and
a transceiver operative to perform the sidelink transmission and reception on the determined BWP in the carrier,
wherein more than one BWPs are active in the carrier at the same time.

(32). The user equipment according to (31), wherein the more than one BWPs comprise the BWP assigned for the sidelink transmission and reception in the carrier and another BWP assigned for transmission between the user equipment and a base station in the carrier.

(33). A wireless communication method for a user equipment, comprising: determining a Bandwidth Part (BWP) assigned for sidelink transmission and reception in a carrier; and
performing the sidelink transmission and reception on the determined BWP in the carrier,
wherein more than one BWPs are active in the carrier at the same time.

(34). The wireless communication method according to (33), wherein the more than one BWPs comprise the BWP assigned for the sidelink transmission and reception in the carrier and another BWP assigned for transmission between the user equipment and a base station in the carrier.

The invention claimed is:

1. A base station, comprising:
circuitry, which, in operation, assigns a first Bandwidth Part (BWP) for sidelink communication in a carrier to a user equipment, and assigns a second BWP assigned for a communication between the user equipment and the base station in the carrier to the user equipment; and
a transceiver, which, in operation, performs the communication with the user equipment on the determined second BWP, and transmits a BWP configuration indicating the assigned first BWP,
wherein the second BWP is a BWP that is dynamically switched among a plurality of second BWPs assigned for the communication between the user equipment and the base station in the carrier, and the first BWP is a BWP that is not dynamically switched.

2. The base station according to claim 1, wherein the first BWP and the second BWP are active in the carrier at the same time.

3. The base station according to claim 1, wherein a sidelink duration in a slot in the first BWP is changed according to a change of a slot format in the second BWP in a case of Time Division Duplexing (TDD).

4. The base station according to claim 1, wherein whether the user equipment performs the sidelink communication on the assigned first BWP or performs the communication between the user equipment and the base station on the assigned second BWP is based on priorities.

5. The base station according to claim 1, wherein the transceiver, in operation, transmits an indication for the dynamic BWP switching via a downlink control information (DCI).

6. The base station according to claim 1, wherein the BWP configuration includes a bitmap indicating a time domain resource for the sidelink communication.

7. A communication method, comprising:
   assigning a first Bandwidth Part (BWP) for sidelink communication in a carrier to a user equipment;
   assigning a second BWP assigned for a communication between the user equipment and a base station in the carrier to the user equipment;
   performing the communication between the base station and the user equipment on the determined second BWP; and
   transmitting a BWP configuration indicating the assigned first BWP from the base station to the user equipment,
   wherein the second BWP is a BWP that is dynamically switched among a plurality of second BWPs assigned for the communication between the user equipment and the base station in the carrier, and the first BWP is a BWP that is not dynamically switched.

8. The communication method according to claim 7, wherein the first BWP and the second BWP are active in the carrier at the same time.

9. The communication method according to claim 7, wherein a sidelink duration in a slot in the first BWP is changed according to a change of a slot format in the second BWP in a case of Time Division Duplexing (TDD).

10. The communication method according to claim 7, wherein whether the user equipment performs the sidelink communication on the assigned first BWP or performs the communication between the user equipment and the base station on the assigned second BWP is based on priorities.

11. The communication method according to claim 7, comprising transmitting an indication for the dynamic BWP switching via a downlink control information (DCI).

12. The communication method according to claim 7, wherein the BWP configuration includes a bitmap indicating a time domain resource for the sidelink communication.

\* \* \* \* \*